United States Patent
Tran

(10) Patent No.: US 10,735,425 B2
(45) Date of Patent: Aug. 4, 2020

(54) INVOCATION PATH SECURITY IN DISTRIBUTED SYSTEMS

(71) Applicant: Pivotal Software, Inc., San Francisco, CA (US)

(72) Inventor: William Tran, Ontario (CA)

(73) Assignee: Pivotal Software, Inc., San Francisco, CA (US)

( * ) Notice: Subject to any disclaimer, the term of this patent is extended or adjusted under 35 U.S.C. 154(b) by 542 days.

(21) Appl. No.: 15/421,255

(22) Filed: Jan. 31, 2017

(65) Prior Publication Data

US 2018/0219863 A1 Aug. 2, 2018

(51) Int. Cl.
| | |
|---|---|
| *H04L 29/06* | (2006.01) |
| *H04L 29/08* | (2006.01) |
| *H04L 9/32* | (2006.01) |
| *H04W 12/06* | (2009.01) |
| *G06F 21/30* | (2013.01) |
| *G06Q 30/06* | (2012.01) |
| *G06Q 10/08* | (2012.01) |

(52) U.S. Cl.
CPC .............. *H04L 63/10* (2013.01); *G06F 21/30* (2013.01); *H04L 9/3247* (2013.01); *H04L 63/0428* (2013.01); *H04L 63/06* (2013.01); *H04L 63/08* (2013.01); *H04L 63/20* (2013.01); *H04L 67/02* (2013.01); *H04W 12/06* (2013.01); *G06Q 10/087* (2013.01); *G06Q 30/0633* (2013.01)

(58) Field of Classification Search
CPC ... H04L 2209/38; H04L 63/08; H04L 9/3268; H04L 63/0823; H04L 9/3263; H04L 9/0637; H04L 9/3213; G06F 21/64; G06F 21/33
See application file for complete search history.

(56) References Cited

U.S. PATENT DOCUMENTS

| | | | |
|---|---|---|---|
| 6,898,711 B1 | 5/2005 | Bauman et al. | |
| 10,127,030 B1* | 11/2018 | Mortnnan | G06F 8/64 |
| 2004/0117623 A1* | 6/2004 | Kalogridis | H04L 63/0807 |
| | | | 713/165 |
| 2006/0021016 A1* | 1/2006 | Birk | H04L 63/08 |
| | | | 726/10 |

(Continued)

OTHER PUBLICATIONS

'www.youtube.com' [online]. "USENIX Enigma 2016—PKI at Scale Using Short-lived Certificates," Feb. 1, 2016, [Retrieved on Sep. 19, 2017], Retrieved from the Internet: URL<https://www.youtube.com/watch?v=7YPIsbz8Pig>, 2 pages.
International Search Report and Written Opinion in International Application No. PCT/US2018/016204, dated Apr. 11, 2018, 14 pages.

(Continued)

*Primary Examiner* — Trang T Doan
(74) *Attorney, Agent, or Firm* — Fish & Richardson P.C.

(57) ABSTRACT

Systems, methods, and computer program products for an application to securely record and propagate an invocation context for invoking other applications are described. The applications being invoked not only receive a user's authentication token, but also authentication tokens of an entire invocation chain. Accordingly, the applications being invoked can verify a chain of custody through verification of nested, cryptographically signed payloads of a chain of authentication tokens. An application can thus verify identities of each application in the chain of custody, as well as the invocation contexts (e. g. the HTTP request method and path) in which each application in the chain invoked the next application.

20 Claims, 6 Drawing Sheets

(56) References Cited

U.S. PATENT DOCUMENTS

| | | | |
|---|---|---|---|
| 2010/0030805 A1 | 2/2010 | Hinton et al. | |
| 2010/0154040 A1* | 6/2010 | CHiu | H04L 63/0823 726/5 |
| 2013/0275311 A1* | 10/2013 | Kohn | G06Q 30/0609 705/71 |
| 2014/0245389 A1* | 8/2014 | Oberheide | H04L 63/0815 726/3 |
| 2016/0127352 A1* | 5/2016 | Xu | H04W 12/06 726/8 |
| 2016/0142409 A1* | 5/2016 | Frei | H04L 63/0884 713/176 |
| 2017/0005804 A1* | 1/2017 | Zinder | H04L 9/3247 |
| 2017/0012980 A1* | 1/2017 | Sanso | H04L 63/10 |
| 2017/0094513 A1* | 3/2017 | Kelts | H04W 12/06 |
| 2018/0048638 A1* | 2/2018 | Lewis | H04L 63/0807 |
| 2018/0077144 A1* | 3/2018 | Gangawane | H04L 63/102 |

OTHER PUBLICATIONS

PCT International Preliminary Report on Patentability issued in International Application No. PCT/US2018/1016204 dated Aug. 6, 2019, 8 pages.

\* cited by examiner

INVOCATION PATH SECURITY IN DISTRIBUTED SYSTEMS

This disclosure generally relates to data security in a distributed computing environment.

Conventional authorization techniques, e.g., OAuth 2, allow users to delegate abilities to multiple applications, so applications can act on resources on the users' behalf. In a microservice-based computing platform, a Web-based service can include many applications. Each application performs certain functions of the service, each application configured to handle requests from other applications. Resource access can involve requests going through multiple layers of APIs (application program interfaces). Different teams developing the Web service may be responsible for delivering different applications that have different security trust boundaries.

Conventional authorization techniques are not designed to address nuances of crossing multiple trust boundaries of the different teams to serve a single user's request. A naive service in this situation may propagate the user's token throughout the microservice-based computing platform. When teams do not fully trust each other, this paradigm presents a security risk. For example, if one application is compromised, the compromised application may use that user's token to call any other application. This is undesirable.

SUMMARY

This specification describes techniques for an application to securely record and propagate an invocation context for invoking other applications. The applications being invoked not only receive a user's token, but also authentication tokens of an entire invocation chain. Accordingly, the applications being invoked can verify a chain of custody through verification of nested, cryptographically signed payloads of a chain of authentication tokens. An application can thus verify identities of each application in the chain of custody, as well as the invocation contexts, e. g. an HTTP request method and path, in which each application in the chain invoked the next application.

The subject matter described in this specification can be implemented in various embodiments so as to realize one or more of the following advantages. For example, the disclosed techniques improve upon conventional authorization technology in a microservice-based computing platform by authenticating and authorizing chains of invocations that cross multiple trust boundaries to service a user's request. The disclosed technology provides additional information for authorizing an invocation request before invoking an application in an invocation chain. When two applications in the chain do not fully trust each other, one application can use the additional information provided by other applications in the invocation chain to make an authorization decision. Compared to conventional technology where a user's token is used for authentication and authorization throughout an invocation chain, the disclosed technology reduces security risks. When an application in the invocation chain is compromised, the disclosed technology can prevent that application from calling other applications, even when the compromised application provides some legitimate credentials.

Compared to conventional authorization technology where token re-issuance occurs through an external authorization server when crossing trust boundaries, the disclosed techniques improve performance. The disclosed techniques replace the re-issuance through the external authorization server with token self-issuance and self-verification using an internal service registry, thereby reducing network resource usage and reducing performance penalty. The disclosed techniques enhance security when crossing trust boundaries by replacing caching and reusing of tokens with single use tokens and single use wrappers, thus preventing replay attack.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
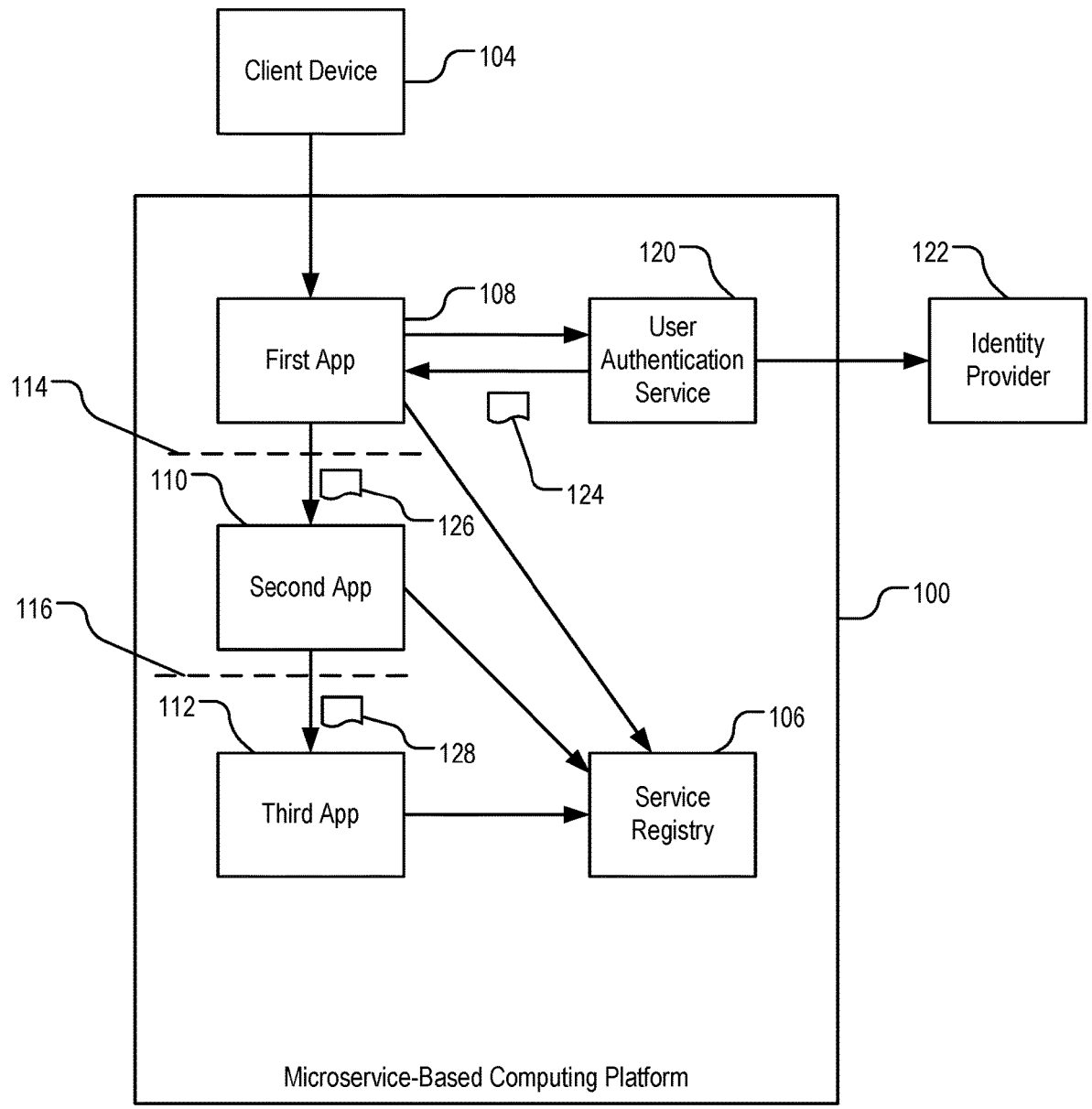
FIG. 1 is a block diagram illustrating an example system implementing invocation path authentication.

FIG. 1 is a block diagram illustrating an example system 100 implementing invocation path authentication. The system 100 is a distributed computing system including multiple computer processors. In some implementations, the system 100 is a microservice-based computing platform, where multiple applications in various microservices perform various functions by responding to requests from other applications. An invocation path includes a chain of invocations from one application to a next application.

For example, in an online shopping workflow, the system 100 receives requests from a client device 104, e.g., a mobile computer of a user. A first application 108 of the system 100 can provide a gateway service including, for example, authenticating the user. A second application 110 of the system 100 provides shopping cart functions. A third application 112 performs inventory management functions. Thus, for example, the system 100 causes the client device 104 to display an online store front and allows a user to log in. Through the client device 104, the system 100 receives a user input selecting an item of goods or services to put in a virtual shopping cart. The system 100 causes the client device 104 to display a checkout screen, and receive a purchase input. The system 100 initiates a transaction to collect payment, and causes a confirmation email to be sent to the client device 104. The system 100 then causes the purchased item to be shipped to the user.

Each application in the system 100 may invoke another application. A series of invocations form an invocation path. In the invocation path, an application, e.g., the first application 108, that invokes another application, e.g., the second application 110, is referred to as an upstream application, where the application being invoked is referred to as a downstream application. An invocation path where the first application 108 invokes the second application 110, which, in turn, invokes the third application 112, the first application 108, second application 110 and third application 112 can be referred to, respectively, as an upstream application, a midstream application and a downstream application.

The first application 108, second application 110 and third application 112 can be developed by different teams. Security trust boundaries 114 and 116 separate the first application 108, second application 110 and third application 112. A security trust boundary is a virtual boundary where applications on two sides of the virtual boundary do not fully trust one another, even if they can authenticate each other. For example, the security trust boundary 114 indicates that the second application 110 does not authorize an invocation request from the first application 108 solely on the basis of the first application 108 authenticating itself to the second application 110. In order for the second application 110 to authorize the invocation request, the first application 108 must also prove that it is acting on behalf of a user.

Each of the first application 108, the second application 110, and the third application 112 can be associated with a virtual hostname. A virtual hostname of an application is a configurable name that the corresponding application is referred to in the system 100. For example, first application 108, the second application 110, and the third application 112 can have virtual hostnames H1, H2 and H3, respectively. Each of the first application 108, the second application 110, and the third application 112 can have one or more instances running on the system 100. Each instance can have an instance identifier. A service registry 106 can have an existing trust relationship with each of the first application 108, the second application 110, and the third application 112. Each instance, upon startup, registers with the service registry 106.

The service registry 106 can authenticate the registration requests using the pre-established trust relationship. The system 100 creates the trust relationship by binding each of the first application 108, the second application 110 and the third application 112 to a service instance of the service registry 106. At the binding, a service broker generates respective credentials for each of the first application 108, the second application 110 and the third application 112. Each of the first application 108, the second application 110 and the third application 112 can use the corresponding credentials to make registration requests for populating the service registry 106. The trust relationship and authentication of registration requests can prevent unauthorized applications from registering using the names of authorized applications, or changing a public key of an existing service record of an application to compromise the service registry 106.

The first application 108, upon receiving a user's request from the client device 104, authenticates the user. The first application 108 communicates with a user authentication service module 120. The user authentication service module 120 can be a single sign-on (SSO) module. The user authentication service module 120 then communicates with an identity provider (IdP) 122, e.g., a security assertion markup language (SAML) IdP, that provides an assertion of the user. The user authentication service module 120 then translates the assertion into an initial token 124 that represents the user. The initial token can be a JSON Web token (JWT).

The first application 108 then responds to the user's request by submitting an invocation request to the second application 110. Instead of relaying the initial token 124 received from the user authentication service module 120 without additional information, the first application 108 creates its own authentication token 126. The authentication token 126 includes the initial token 124, an instance identifier of the running instance of the first application 108, as well as the invocation request method and path to be executed. The first application 108 then signs the authentication token 126 with a private key of the first application 108. If the request has a body, the first application 108 signs the body with the same private key. The first application 108 then sends the authentication token 126 and the signed body, if any, to the second application 110 in association with an invocation request.

The second application 110, authenticates the invocation request from the first application 108 using authentication token 126. The second application 110 authorizes the request because token 126 contains the initial token 124 that represents the user, showing that the first application 108 is acting on behalf of that user. Upon authorizing the invocation request, the second application 110 performs various functions. Some of the functions may require the second application 110 to invoke the third application 112.

To invoke the third application 112, the second application 110 adds additional information to the authentication token 126 to generate a second authentication token 128. The second authentication token 128 can include the initial token 124, the first authentication token 126, and the additional information. The second application 110 signs the second authentication token 128. The second application 110 then submits a second invocation request to the third application 112, where the second invocation request is associated with the signed second authentication token 128. Thus, the third application 112 can have authentication information for the user, and for an invocation path that includes the invocation of the first application 108 and the second application 110. Not fully trusting the second invocation request, the third application 112 can authenticate the second invocation request using the second authentication token 128, and can authorize the invocation request by inspecting the invocation path as well as the user's details.

Each of the first application 108, second application 110 and third application 112 can perform authentication of the respective invocation request using the received token through the service registry 106. The service registry 106 is a repository of authentication information populated by each of the first application 108, second application 110 and third application 112 at startup time, when the first application 108, second application 110 and third application 112 instantiate. When, for example, the third application 112 receives an invocation request from the second application 110, the third application 112 can authenticate the received authentication token 128 using information in the service registry 106 provided by the second application 110.

The authentication token 128 is signed by the second application 110 using a private key. The third application 112 authenticates the invocation request by verifying the authentication token 128 using a public key in the service registry 106 to determine whether the invocation request is a legitimate invocation request. The service registry 106 is internal to the system 100. The third application 112 need not communicate with the identity provider 122. Accordingly, the authentication avoids incurring a large amount of overhead in term of network resources. The authentication token 128 contains authentication information for the entire invocation path. The third application 112 can authenticate each of the invocation requests in the invocation path, across security trust boundaries 114 and 116.

With a verifiable invocation path, each of the second application 110 or the third application 112 can apply a security policy to any portion of the entire invocation path to approve or deny an invocation request. The security policy can be defined in terms of the business capabilities of the user, the identities of the downstream applications and the request methods and paths that were executed. The security policies can prevent a bare user token, e.g., the initial token 124, to be used without being first wrapped by an authentication token of an application. Additional details on the security policy are described below in reference to FIG. 5. The authentication tokens 126 and 128 can be single use tokens, ensuring that each of the authentication tokens 126 and 128 can be used to authenticate an invocation request only once, and only for an intended use.

Figure 2:
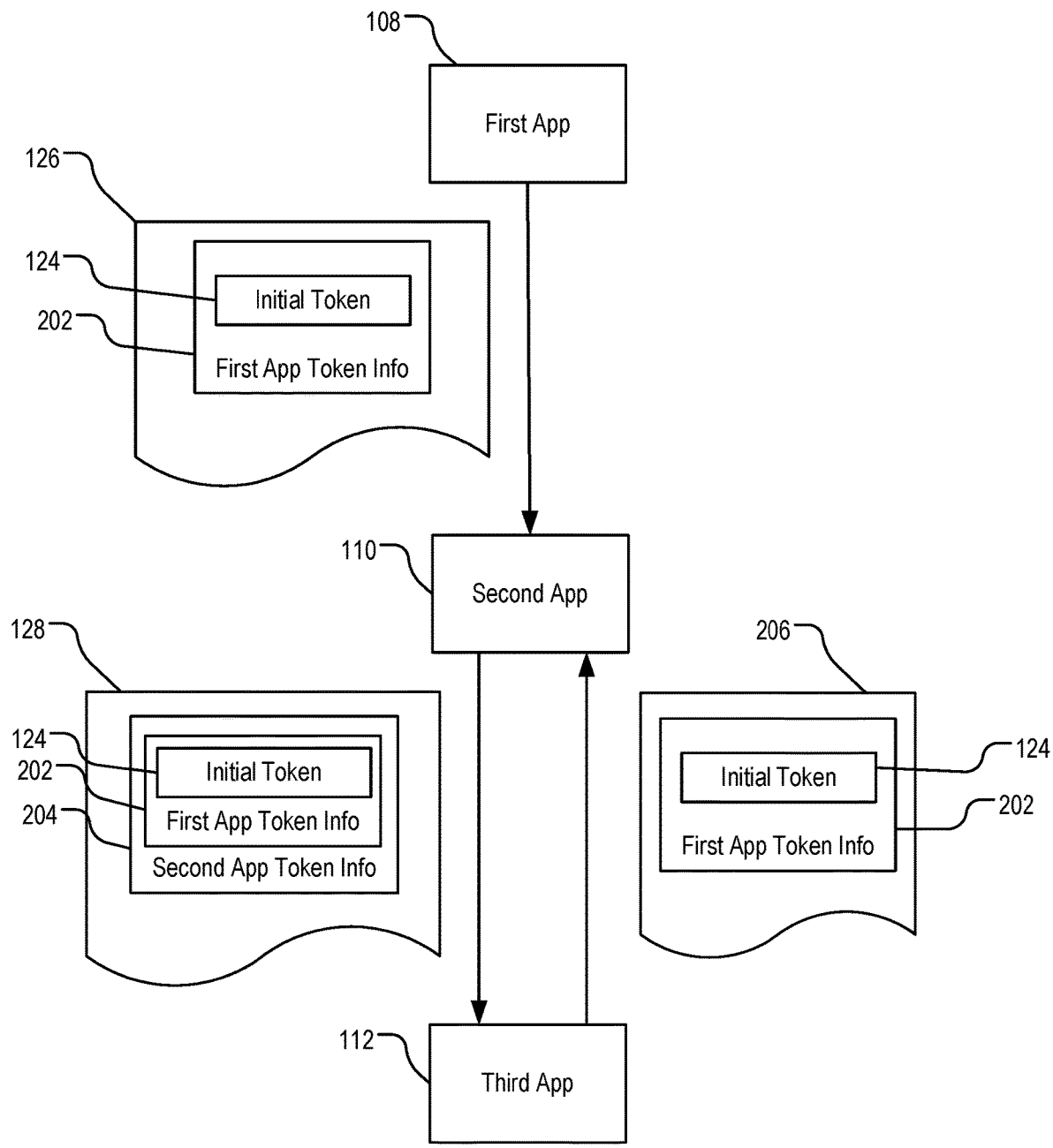
FIG. 2 is a block diagram illustrating example chain token techniques of invocation path authentication.

FIG. 2 is a block diagram illustrating example chain token techniques of invocation path authentication. A first application 108 in a system, e.g., the system 100 of FIG. 1, is invoked in response to a user request. The first application 108 receives an initial token 124. The first application 108, upon authenticating the initial token 124, generates first application token information 202. The first application token information 202 includes identity of the first application 108 and other information related to what invocation request the first application 108 will issue. The first application 108 generates an authentication token 126 by wrapping the first application token information 202 around the initial token 124. Accordingly, the authentication token 126 is a chain token having two chain links on an invocation path. The two chain links include the initial token 124 and the first application token information 202.

The first application 108 invokes the second application 110 by submitting an invocation request to the second application 110. The first application 108 submits the authentication token 126 to the second application 110 in association with the invocation request, for example, as an HTTP header of the invocation request.

Likewise, the second application 110, upon authenticating the authentication token 126, generates second application token information 204. The second application 110 generates a second authentication token 128 by adding the second application token information 204 to the authentication token 126. The second application 110 invokes the third application 112 by submitting a second invocation request to the third application 112 and submitting the authentication token 128 to the third application 112. The authentication token 128 is a chain token including three chain links of the invocation path. The three chain links are the initial token 124, the first application token information 202, and the second application token information 204.

In the example invocation path above, the second application 110 is an upstream application relative to the third application 112. The third application 112 can attempt to reverse roles by invoking the second application. The third application 112 issues an invocation request to the second application. If the third application 112 is compromised, the third application 112 may strip the second application token information 204 from the authentication token 128 to generate a stripped authentication token 206. The stripped authentication token 206 can have the same content as the authentication token 126. The third application 112 submits the stripped authentication token 206 to the second application 110. The call may present a security risk, because the second application 110 may not be able to distinguish the stripped authentication token 206 from the legitimate authentication token 126.

In some implementations, making the authentication tokens 126 and 128 single use tokens mitigates this risk. The second application 110 has already authenticated an invocation request using the authentication token 126. Since authentication token 126 is a single use token, the second application 110 rejects the invocation request because the stripped authentication token 206 has the same content as the authentication token 126. In some implementations, the system mitigates the risk using wrapper techniques described below in reference to FIG. 3.

Figure 3:
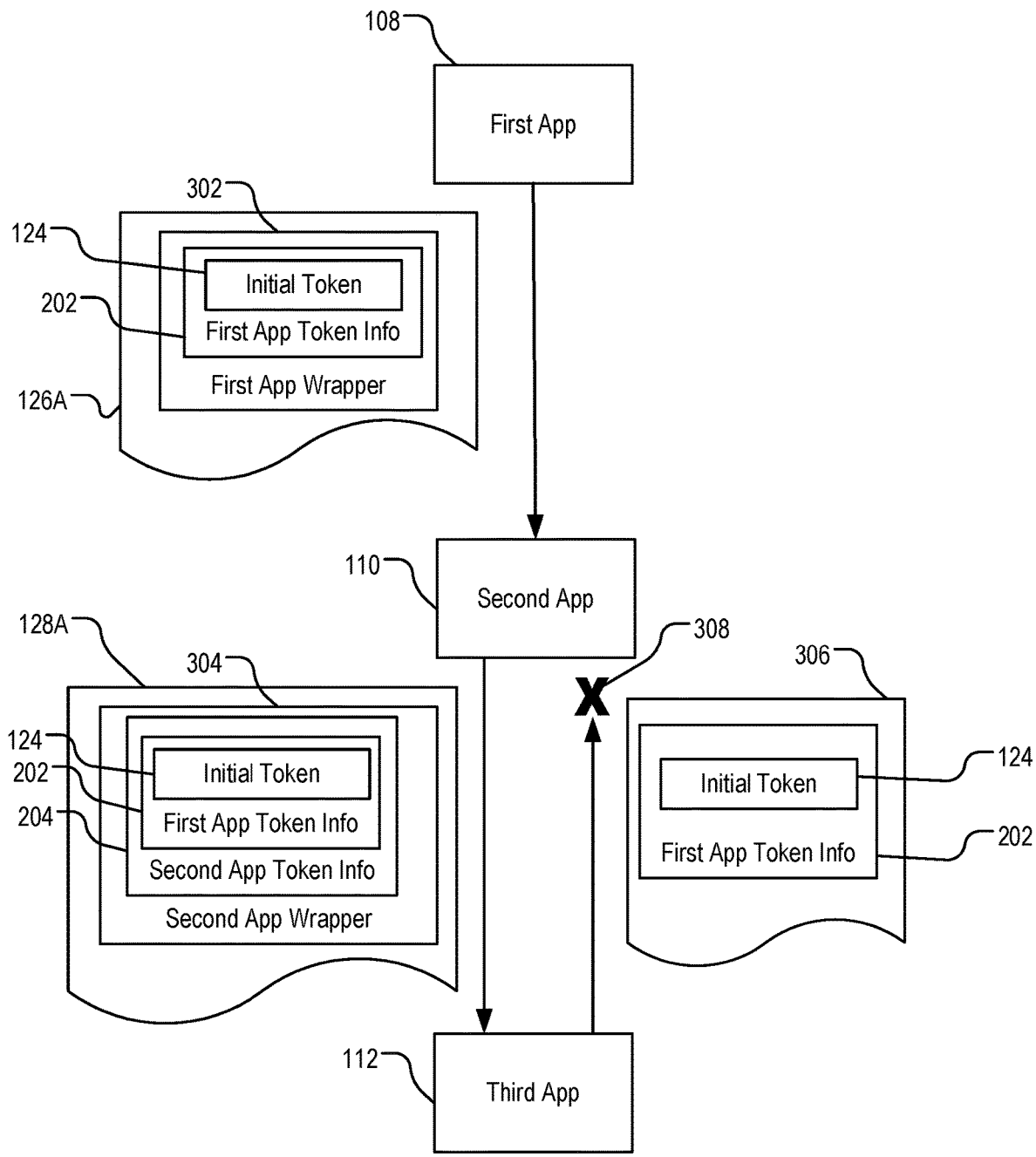
FIG. 3 is a block diagram illustrating example chain token and wrapper techniques in invocation path authentication.

FIG. 3 is a block diagram illustrating example chain token and wrapper techniques in invocation path authentication. A first application 108 in a system, e.g., the system 100 of FIG. 1, is invoked. The first application 108 receives an invocation request that is associated with the initial token 124. The first application 108, upon authenticating the invocation request using the initial token 124, generates first application token information 202. The first application 108 adds the first application token information 202 to the initial token 124 to form a chain token. The first application 108 generates a first wrapper 302. The first wrapper 302 is a layer for signing one or more tokens. In some implementations, the first wrapper can be a JSON Web Signature (JWS) wrapper. The first application 108 then designates the wrapped initial token 124 and first application token information 202 as the authentication token 126A. The first application 108 invokes the second application, submitting the authentication token 126A to the second application 110 in association with an invocation request.

The second application 110, upon receiving the authentication token 126A, authenticates the invocation request using the initial token 124 and the first application token information 202 using the first wrapper 302. The second application 110 then discards the first wrapper 302. The second application 110 performs a task according to the invocation request. The task can include invoking the third application 112 to perform a function. The second application 110 generates second application token information 204. The second application generates a second wrapper 304. The second wrapper 304 can be a layer for signing one or more tokens. In some implementations, the second wrapper can be a JWS wrapper. The second application 110 strips the first wrapper 302 from the received authentication token 126. The second application 110 designates the initial token 124, the first application token information 202, and second application token information 204, all wrapped in the second wrapper, as the authentication token 128A. The second application 110 then invokes the third application 112, including passing the authentication token 128A to the third application 112 in association with an invocation request. The second application 110 prevents the first wrapper 302 from being submitted to the third application 112.

The third application 112 can authenticate the invocation request using the initial token 124, the first application token information 202 and the second application token information 204 using the second wrapper 304. In a situation where the third application 112 is compromised, the third application 112 may strip the authentication token 128A to generate stripped authentication token 306. The third application submits the stripped authentication token 306 to the second application 110, in an attempt to invoke the second application 110. The stripped authentication token 306 lacks the proper wrapper, which is the first wrapper 302, that is associated with the initial token 124 and the first application token information 202. Accordingly, the second application 110, detecting the lack of wrapper 302, blocks (308) the invocation.

Figure 4:
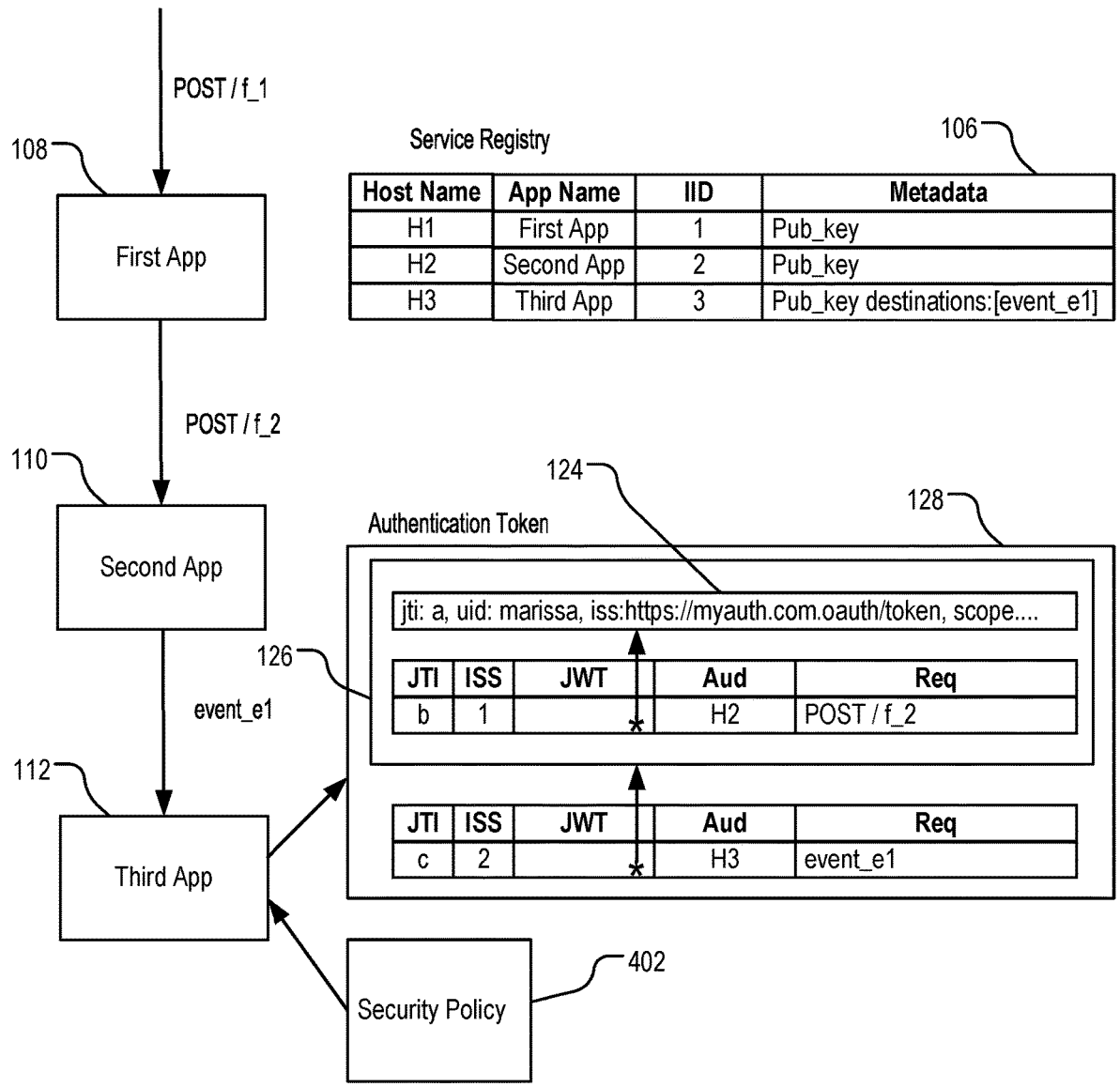
FIG. 4 illustrates content of an example service registry and an example authentication token.

FIG. 4 illustrates content of an example service registry 106 and an example authentication token 128. The service registry 106 stores one or more service records, each corresponding to a respective instance of an application. In the example shown, the service registry 106 stores service records for an instance of a first application 108, an instance of a second application 110, and an instance of a third application 112. In the example shown, an invocation path includes the first application 108, which is an upstream application, second application 110, which is a midstream application and third application 112, which is a downstream application.

Each of the first application 108, second application 110, and third application 112 can populate the service registry 106 at startup time. The startup time is a time that an application instantiates, e.g., when an instance of the application starts to execute. Each of the first application 108, the second application 110 and third application 112, at startup, generates a respective public/private key pair. Each of the first application 108, the second application 110 and third application 112 registers with the service registry 106 at the startup, by providing information including a respective virtual hostname, a respective application name, a respective instance identifier and respective metadata to the service registry 106. The metadata includes the public key. The service registry 106 is readable by all applications using the service registry 106. Each of the first application 108, the second application 110 and third application 112 can keep the respective private key private, e.g., in memory, without transmitting the private key to the service registry 106.

The service registry 106 has a metadata data field for storing the metadata provided by the applications. The metadata can include, in addition to the public key, a destination field, which specifies an invocation action that is permissible. The service registry 106 has a virtual hostname data field for storing a respective virtual hostname of each application. The service registry 106 has an application name data field for storing a respective application name of each application. The service registry 106 has an instance identifier data field for storing a respective instance identifier of each instance in the service registry 106.

At runtime, the first application 108 receives an invocation request, which can be an HTTP POST request f_1. The first application 108, acting as a gateway, requests an initial token 124. The initial token 124 can have a JWT format, and is provided by a user authentication service. The initial token 124 can include information of an authenticated user. The initial token 124 includes multiple data fields, also referred to as claims. The initial token 124 can include an identifier claim, e.g., a JWT identifier (jti) claim storing an identifier of the initial token 124. In the example, the initial token 124 store an identifier "a" in the jti field. The initial token 124 can have an issuer (iss) claim specifying an issuer of the initial token 124, and an audience (aud) claim storing identifying a recipient that the initial token 124 is intended for.

The initial token 124 can have a scope claim specifying a scope of the initial token 124. When the first application 108 requests a token for the user from a user authentication service, the first application 108 can request specific scopes, which are values that indicate what can be done with the initial token 124. In some implementations, the scopes include a minimum set of values that are the intersection of the following sets:

(a) What things can be done through this particular application?
(b) What is the user is allowed to do in the system?
(c) What does the user want to do in this application?

The first application 108 invokes the second application 110 by sending an invocation request downstream to the second application 110. During the invocation, the first application 108 propagates an invocation context in the invocation request. Propagating the invocation context includes wrapping a token receive by the first application in another token that describes the invocation to be performed. In this example, the first application 108 wraps the received initial token 124 in a first authentication token 126 generated by the first application 108. The wrapping includes designating the initial token 124 as a part of the first authentication token 126. The first application 108 signs the first authentication token 126 using the private key of the first application 108.

The second application 110 receives the first authentication token 126 associated with an invocation request generated by the first application 108. The second application 110 authenticates the invocation request using the first authentication token 126. The second application 110 wraps the first authentication token 126 in a second authentication token 128 generated by the second application 110. The wrapping includes designating the first authentication token 126 as a portion of the second authentication token 128. The second application 110 signs the second authentication token 128 with a private key, and submits the second authentication token 128 to the third application 112 in association with a second invocation request.

Each of the authentication tokens 126 and 128 can be a JWT, the format of which is specified by RFC-7519. In some implementations, an invocation request contains a body. The body can be expressed as a JWS specified by RFC-7515. The system uses these standards to protect the integrity of a payload. In the former case, the payload is a JSON object containing data fields, referred to as claims. In the latter case, the payload is any request body. Each of the first application 108 and the second application 110 signs headers of the invocation requests as required for properly interpreting each payload, as well as the payload itself, using a respective private key of the corresponding application.

The second application 110 verifies the integrity of the payload in the first authentication token 126 using the public key of the first application 108. The public key corresponds to the private key with which the first application 108 signed the first authentication token 126. The third application 112 verifies the integrity of the payload in the second authentication token 128 using the public key of the second application 110. The public key corresponds to the private key with which the second application 110 signed the second authentication token 128. Each of the second application 110 and the third application 112 obtains the corresponding public key through the service registry 106.

Each of the authentication token 126 and the authentication token 128 has multiple claims. The claims include a parent claim for identifying a parent. The parent claim can have a claim name jwt, when the authentication tokens are JWTs. The parent claim is a nonstandard claim. The parent claim stores the value of the token that the sender originally received. In the example shown, when the first application 108 submits an invocation request to the second application 110, the first application 108 creates the first authentication token 126 that contains the initial token 124 in the parent claim. When the second application 110 receives this invocation request from the first application 108 and makes a second invocation request to the third application 112, the second application 110 creates the authentication token 128, which contains the first authentication token 126 it received, in the parent claim. As the invocation requests progresses downstream, the parent claim captures the details of each previous invocation request all the way back to the initial token 124.

Each of the authentication token 126 and the authentication token 128 has a respective identifier (jti) claim. The identity claim stores a unique identifier for the corresponding authentication token. The identity claim can prevent the authentication token from being replayed. In Java, the first application 108 and the second application 110 can generate the identifier using UUID.randomUUID( ), where the underlying source of randomness is a SecureRandom. To prevent replay, the system can record the jti of each authentication token that was created in response to service invocation requests in a data store that stores information to ensure single use. The system can check the data store whether there are other invocations with the same identifier as the jti of the authentication token 126 and the jti of the authentication token 128. If yes, the system prevents the authentication token 126 and the authentication token 128 from being authenticated. If there are none, the system records the invocation by recording the identifier or identifiers of the identity claim in the data store.

Each of the authentication token 126 and the authentication token 128 has a respective issuer (iss) claim, which identifies an issuer that issued the corresponding authentication token. The issuer claim of the initial token 124 can contain an URI of a token endpoint that generated the initial token 124, e.g., "https://myauth.com/oauth/token." For other applications, e.g., the applications 108 and 110, the issuer claim is an instance identifier of the instance of the application 108 or application 110 that issued the authentication token. This is the same instance identifier that the application 108 or application 110 register with the service registry 106 at startup time.

Each of the authentication token 126 and the authentication token 128 has a respective audience (aud) claim. The audience identifies recipients that the corresponding authentication token is intended for. The value of audience claim can be a virtual hostname that the invocation request is to be routed to.

Each of the authentication token 126 and the authentication token 128 has a respective request (req) claim. The request claim is a nonstandard claim that describes the operation to be invoked on the recipient. For HTTP requests, this claim can include the request method, path and query component of the request URI, e.g., "GET /api/accounts?type=trading." For messaging, this can be a destination name.

Each of the authentication token 126 and the authentication token 128 has a respective issued time (iat) claim. The issue time claim identifies the time at which a respective application issued the corresponding authentication token. Each of the authentication token 126 and the authentication token 128 has a respective expiration time (exp) claim. The expiration time claim identifies the expiration time on or after which the authentication token 128 shall be rejected. When the authentication token 128 is a single use token, this value can be an upper bound of the time that the corresponding invocation request would be validated by a downstream application. For example, if it should not take more than five seconds for the third application 112 receive and validate the request, the value of the expiration time claim in the authentication token 128 can be iat+5. For messaging implementations, this value can be longer than five seconds.

Each of the authentication token 126 and the authentication token 128 has a respective body (bdy) claim. The body claim is a nonstandard claim that includes a flag indicating that a request body must also be present in the invocation request. For example, in the authentication token 128, value of Boolean true indicates that the request body is signed, and contains the identifier of the authentication token 128. The third application 112 can validate the body the same public key used to validate the authentication token 128. The use of this claim prevents the third application 112 from using authentication token 128 to authenticate an invocation request that has had its request body removed.

In the example shown, for a first authentication token 126 issued by the first application 108 and wrapped in the authentication 128, an identifier claim stores an identifier "b" of a first authentication token. An issuer claim stores an instance identifier of the first application 108 as stored in the service registry 106. In the example shown, the issuer is the instance of the first application 108 having an instance identifier "1" in the service registry 106. An audience claim stores one or more virtual hostnames. Here, the and is H2, which is associated with the second application 110. This audience claim with the value "H2" indicates that the second application 110 is a member of intended audience of the first authentication token. A request (req) claim specifies a request type, here, HTTP POST/f_2 by which the first application 108 is intends to invoke the second application 110.

The second application program 110, in response to receiving the invocation request from the first application program 108 for POST/f_2, inspects the first authentication token 126 to verify that the intent of the first authentication token 126 corresponds to the operation to be performed. The second application program 110 inspects the audience claim and request claim. The second application 110 identifies its virtual hostname in the audience claim. The second application 110 determines that the request claim unambiguously describes the invocation request received by the second application 110. The second application 110 may also ensure that a user initiating the chain of calls is authorized to perform this action, by examining the scope claim of the initial token 124.

The second application 110 propagates the invocation context to the third application 112. The second application 110 can wrap the first authentication token 126 it received in the same manner, to generate the second authentication token 128. The second authentication token 128 can have an identifier claim having an example identifier "c." The second application 110 signs the second authentication token 128 using a private key. The second application 110 designates a virtual hostname H3 in the audience claim, and designates event_e1 as a destination that a receiver of the invocation request should listen to.

In the example shown, the invocation request that invokes the third application is a message. Upon receiving the message from the second application 110, e.g., a message from the event_e1 queue, the third application 112 inspects the aud and req values, which may have the virtual hostname of the third application 112 and the identifier event_e1, respectively. The third application verifies that the intent of the second application 110 as specified in the signed authentication token 128 corresponds with the operation to be performed, and performs the operation upon successful verification.

The third application 112 can verify a chain of custody by correlating the audience claim of an inner token, here, the first authentication token 126, with a virtual hostname that the second application 110 registered with the service registry 130. In this case, the outermost token is the second authentication token 128. This token has an identity claim "c" and issuer claim "2," which corresponds to a service record having an instance identifier having the same value "2" in the service registry 106. A registered virtual host in this service record in the service registry 106 is "H2." The inner token is the first authentication token 126. This token has an identity claim "b" and audience claim of "H2" that matches the name in the service registry. Accordingly, the chain of custody as claimed in the authentication token 128 is verified.

In various implementations, the second application 110 invokes the third application 112 through messaging, or using HTTP POST. In the messaging implementations, the third application 112 listens to a message queue, e.g., a RabbitMQ® (RMQ) topic. In the example shown, the topic is called "event_e1." Other applications can listen to the same message queue. When the third application 112 registers with the service registry 106, the third application 112 provides destinations it listens to in its metadata. To populate the audience claim of the second authentication token 128, the second application 110 performs a lookup for possible applications that can receive the message. The second application 110 can perform the lookup by searching through the metadata field in service records of the service registry 106.

In the example shown, the second application 110 finds the third application 112 as an application that will listen on event_e1. Accordingly, the second application 110 populates the audience claim of the second authentication token 128 with the virtual hostname of the third application 112, and identifiers of other applications that may listen on event_e1. The third application 112 can verify that the third application 112 is the intended recipient of the message generated by the second application 110.

In some implementations, downstream applications of the second application 110 fully trust the second application 110 and do not require authentication of applications upstream of the second application 110. The second application 110 can issue its standalone authentication token, and does not include the first authentication token 126 received by the second application 110. The standalone authentication token may have a single chain link. The third application 112 and other downstream applications can still verify the chain of custody, where the chain starts at the second application 110 and going downstream.

The first application 108 can encode the first authentication token 126, e.g., into a Base64 string. Likewise, the second application 110 can encode the second authentication token 128 into a Base64 string. The second application 110 issues an invocation request to the third application 112. The invocation request is associated with the encoded authentication token 128. For example, the second application 110 can add the encoded authentication token 128 to a header of the invocation request.

The third application 112 verifies the invocation request using the authentication token 128. The third application verifies that the authentication token 128 and a request body, if any, have not been modified, can only be used once, and can only be used for intended purpose.

The third application 112 decodes the authentication token 128 and verifies a signature of the authentication token 128. The third application 112 can verify the signature by performing a lookup of a public key of the second application 110 from the service registry 106 using the identifier in the issuer claim of the authentication token 128.

To get the public key for the authentication token 128, the third application 112 first decodes the authentication token 128 from a Base64 string into JSON (JavaScript Object Notation) document. The third application 112 then extracts the issuer claim value. The third application 112 performs a lookup in the service registry 106 for a service record corresponding to the value. This service record contains the public key in its metadata, which the third application 112 can use to verify the signature of the authentication token 128, and the integrity of the authentication token 128.

The third application 112 validates the audience claim in the authentication token 128. Verifying the audience claim ensures that the authentication token 128 can only be used by the intended recipient. This value corresponds to a virtual hostname. The third application 112 compares this value with the virtual hostname value with which the third application 112 registered with the service registry 106.

The third application 112 validates the request claim. The request claim captures the intent of the second application 110, such that the invocation request can only trigger an operation that the second application 110 authorizes to perform. Validating the request claim can include determining that a method and path header of an HTTP request matches, or can be consistently transformed to match, the value of the request claim. Validating the request claim can include determining if the destination that the third application 112 listens to is the intended destination of that the second application 110 messages, as specified in the request claim.

The third application 112 can validate the expiration time claim of the authentication token 128. Validating the expiration time claim helps prevent the authentication token 128 from being used in a replay attack by reducing the time the authentication token 128 is valid. To validate this claim, the third application 112 checks that the current time, e.g., in seconds since epoch, is less than this value.

The third application 112 can validate the identity claim. The third application 112 can use the identity claim to prevent a replay attack. A data store can store information to keep track of which values have already been seen or acted upon. This validation can occur at the last possible moment when data is about to be committed, or up front in the validation process. The data store can ensure that identity entries can only be added to the data store or looked up in the data store and cannot be deleted from the data store. The data store set a time-to-live (TTL) parameter on the entries corresponding to the exp time. Validating the identity can incur a performance tradeoff of requiring a network hop to the data store, and operational tradeoff of having to set up the data store.

The third application 112 can recursively parse into the parent authentication token. The third application 112 can decode and verify the parent claim in the authentication token 128. The parent claim of the authentication token 128 is the authentication token 126 or a reference to the authentication token 126. The parent claim of the authentication token 126 is the initial token 124 or a reference to the initial token 124. In a first iteration where the parent claim is the authentication token 126, the third application 112 can decode and verify the token's integrity as in the previously described operations for the authentication token 128. In subsequent iterations, third application 112 can continue to decode and verify until encountering the initial token 124.

The third application 112 can decode and verify the initial token 124. Upon determining that the issuer claim of a token is an authentication token endpoint, e.g., a reference to an authentication service, the third application 112 can determine that this token is the initial token 124, and that there are no further tokens to decode and verify. The third application 112 can be preconfigured to trust the issuer of the initial token 124, and preconfigured to get a verification key, e.g., a JWT verification key, for this issuer as needed.

Other than verifying that the issuer is trusted and verifying, based on the verification key for that issuer, that the integrity of the initial token 124 is intact, the third application 112 can verify the expiration time claim of the initial token 124. The expiration time claim of the initial token 124 can convey the length of time the user wishes to delegate the user's abilities via the expiration time claim of the initial token 124. The expiration times of the intermediate authentication tokens may have passed during processing, and need not to be validated during validation of the initial token 124.

The third application 112 can verify a chain of custody based on the authentication token 128. In some implementations, the authentication token 128 may not clearly say from which virtual hostname the authentication token 128 came. The issuer claim may only specify an instance identifier. For verification, the third application 112 uses the service registry 106 to resolve the verification key given the issuer claim value. The third application 112 can use the same lookup process to resolve the virtual hostname from the issuer claim. If the third application 112 performs the lookup process for each token encountered as the third application 112 recursively verifies them, the third application 112 may derive the following structure in Listing 1, where some claims are omitted for brevity.

---

Listing 1. Example Data Structure Derived from a Single Use Token

```
{
  "initialToken": {
    "jti": [an ID for the initial token 124],
    "user_name": "marissa",
    "iss": http://mystor/token"
  },
  "singleUseTokens": [
    {
      "H1": {
        "jti": [an ID for a token generated by the first application 108],
        "iss": [an instance ID of an instance of the first application 108],
        "aud": "H2"
      }
    },
    {
      "H2": {
        "jti": [an ID for a token generated by the second application 110],
        "iss": [an instance ID of an instance of the second application 110],
        "aud": "H3"
      }
    }
  ]
}
```

---

The third application 112 decoded and verified the tokens in this list. With this list of tokens and resolved virtual hostnames, the third application 112 can verify the chain of custody. Starting from the first single use token from H1, the third application 112 can verify that the audience claim is H2. The third application 112 can verify that the next token came from H2, and that token's audience claim is H3, which is the and value that the third application 112 expects. Verifying the chain of custody ensures that the invocation request was actually routed to the intended recipients in each stage of the invocation path. In addition, verifying the chain of custody can detect attempts by an intermediary to send a truncated token.

The third application 112 can enforce one or more security policies 402 on the authentication token 128. After decoding and verification, the third application 112 has a list of verified claims, representing the user, the invocation requests the users and the upstream applications made, and progression of the invocation requests through the system. The third application 112 can apply the one or more security policies 402 to inspect this claims list and allow or deny the request.

Some claims of the authentication token 128 are subject to the one or more security policies 402. These claims include, for example, scope, issuer and audience claims of the initial token 124, address (e.g., IP address) claims and request claims in the wrappers, and each of the virtual hostnames. Additional details on applying a security policy 402 to these claims are described below in reference to FIG. 5.

The third application 112 can validate a body claim and request body in the invocation request. Validating the body claim and the body is deferred until near the end if the entire request must be consumed to validate the body. If the body claim in the authentication token 128 is missing or not true, there must be no request body. If the body claim is true, a request body must be present. The HTTP Content-type header can be application/jose; the body itself can be a JWS. The signature of the JWS must validate using the same key used to validate the authentication token 128. The JWS header must include the identity claim value of the authentication token 128.

If all these checks pass, and there was a request body, the third application 112 can replace the Content-type header of the HTTP request with the value of the content type, e.g., cty, header in the JWS. The third application 112 can replace the input stream with the JWS payload, Base64 decoded into a byte array. A Java HttpServletRequestWrapper would be appropriate here. The transformed request could then be passed down transparently.

Figure 5:
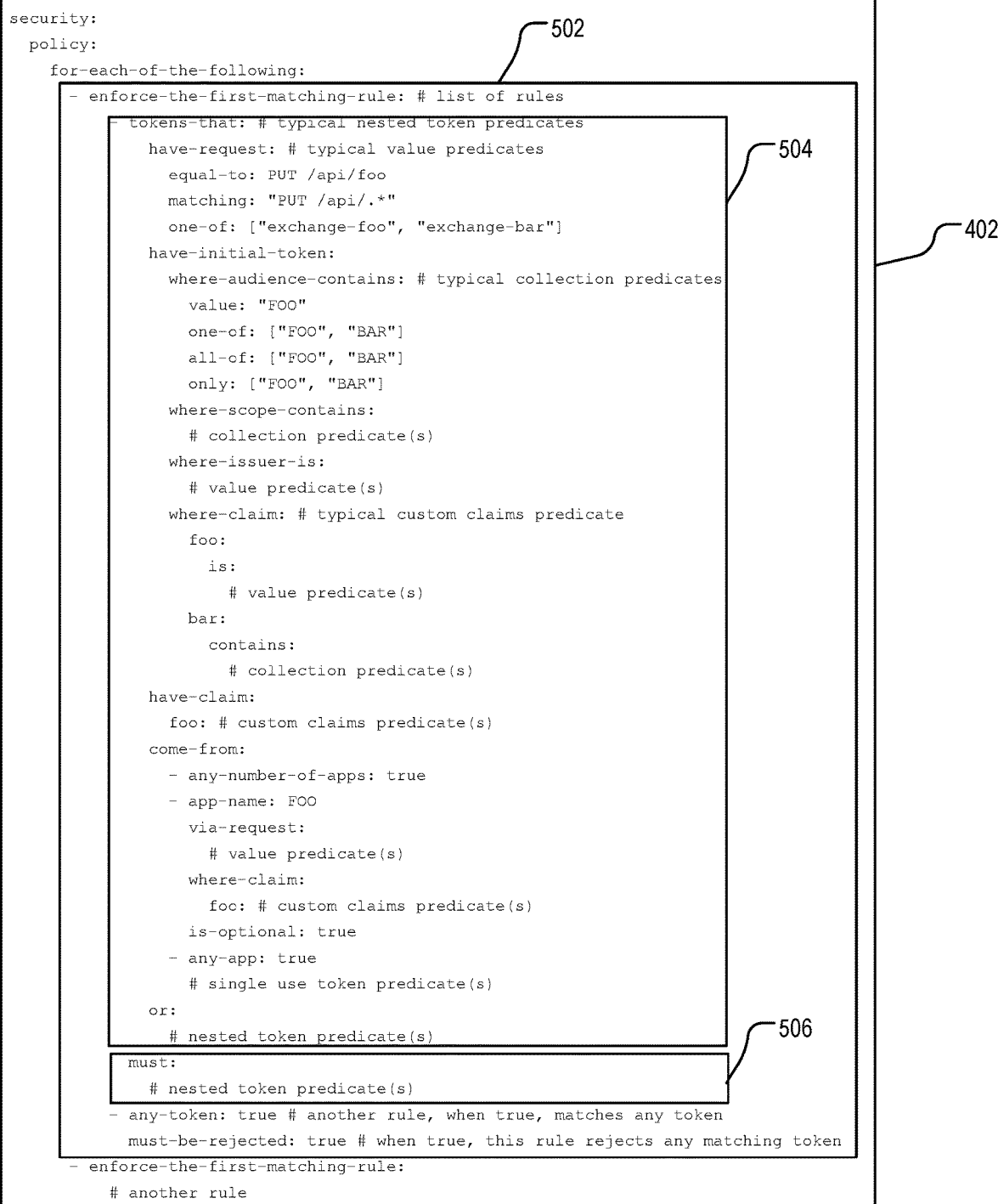
FIG. 5 illustrates an example security policy.

FIG. 5 illustrates an example security policy 402. The security policy 402 can be written in a syntax that resembles sentences, e.g., in YAML. An application, e.g., the third application 112 of FIG. 1, can enforce the security policy 402.

The security policy 402 includes one or more lists of rules, e.g., list 502. The application evaluates each list of rules. The list 502 of rules is denoted with enforce-the-first-matching-rule. The application evaluates the rules in the list 502 in order. Once the application identifies a rule match to a portion of an invocation request, the application evaluates the rule. If the rule does not reject the invocation request, the application evaluates a next rule. If a rule rejects the invocation request, the application stops evaluation, and prevents the invocation request from proceeding further. If no rules match in any of the rule lists, the application prevents the request from proceeding further.

A rule in the list 502 includes two sections, a matcher 504 and an assertion 506. The matcher 504 can be any-token, or, in this example, tokens-that. The assertion 506 can be must or must-be-rejected. The "tokens-that" and "must" can contain any combination of nested token predicates, e.g., have-request, have-initial-token, have-claim, come-from, or "or." The application can treat combinations of predicates as AND. The "or" predicate allows nested token predicates to be treated as OR.

The have-request predicate causes the application to inspect the request claim of the sender's token. In the example at the top of this section, the sender's token is the last token in a single use token list, which was issued by an instance of the second application 110 (of FIG. 4). If there were additional claims added by the sender, the application can inspect the additional claims with have-claim.

The have-initial-token predicate causes the application to inspect an initial token, e.g., the initial token 124 of FIG. 4. The application can inspect aud, issuer and scope claims where-audience-contains, where-scope-contains, and where-issuer-is, respectively. The application can inspect other claims of the initial token using where-claim.

The come-from predicate causes the application to inspect the authentication tokens received. The application can use this predicate to enforce a particular call graph. Entries can have either app-name, any-app, or any-number-of-apps. The app-name matches the virtual hostname that the issuing instance registered with. The via-request causes the application to inspect the request claim of the matching token. The application can inspect additional claims of the matching token using where-claim. The is-optional makes the match optional, and can be used to implement migration-safe rules, e.g. when new applications need to participate in the call graph. The any-number-of-apps predicate matches zero or more authentication tokens. When true, no other predicates can be used in that entry. An application developer can define the security policy 402. The application developer can associate the security policy 402 with an application at build time.

Figure 6:
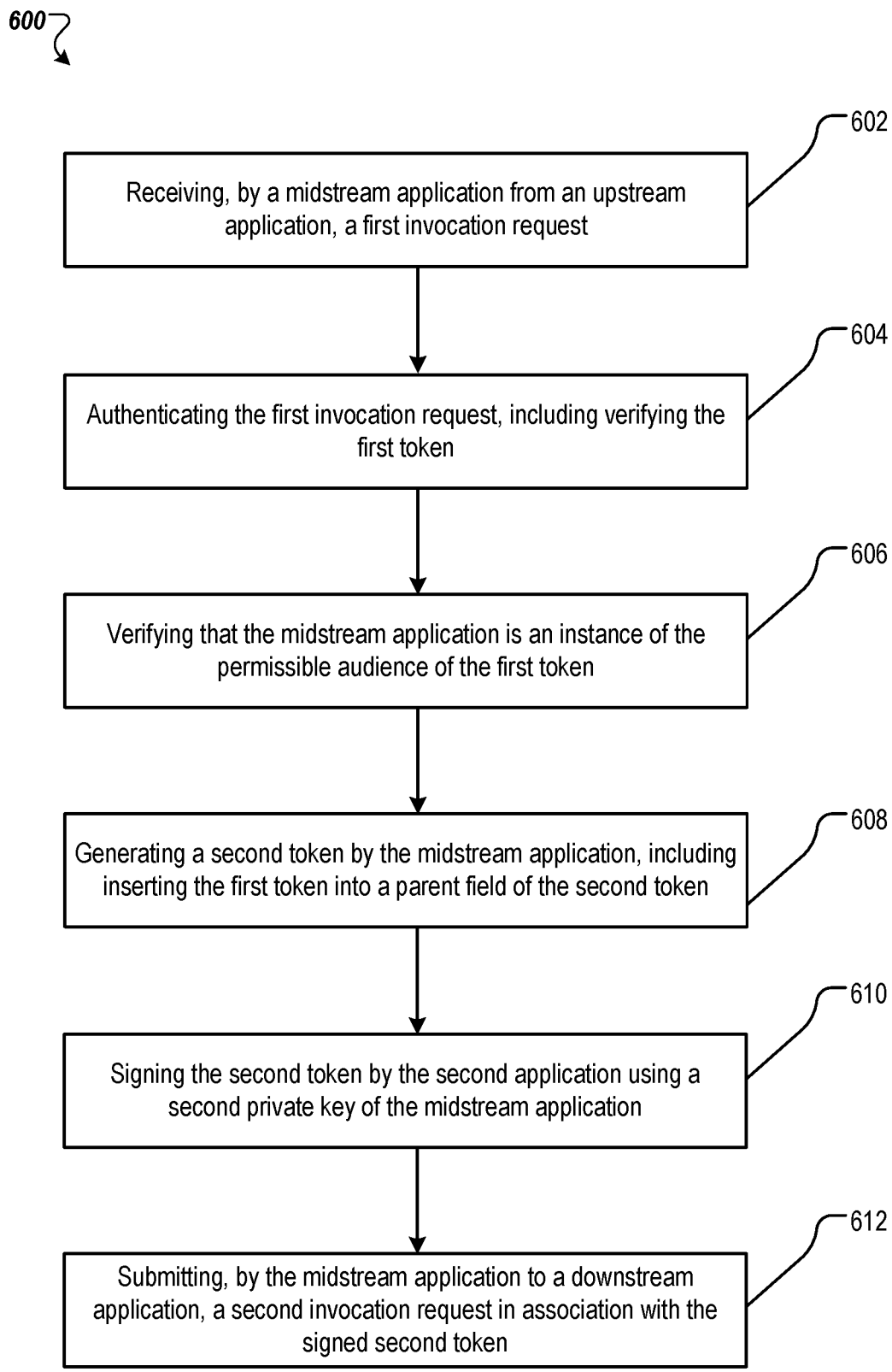
FIG. 6 is a flowchart illustrating an example process of invocation path authentication.

FIG. 6 is a flowchart illustrating an example process 600 of invocation path authentication. The process 600 can be performed by a system of a microservice-based computing platform, e.g., the system 100 of FIG. 1, that includes one or more computer processors. The system is configured to serve one or more user requests, which cause a chain of invocations of an upstream application, a midstream application, and a downstream application of the system. The upstream application, midstream application, and downstream application can be the first application 108, second application 110, and third application 112 of FIG. 1, respectively.

The midstream application receives (602) a first invocation request from an upstream application. The first invocation request is associated with a first token signed by a first private key of the upstream application. The first token specifies permissible audience of the first token. The first token can be a JWT transmitted in a header of the first invocation request. The first token can be a single use token. The first token includes an initial token including credentials of a user initiating the chain of invocation requests including the first invocation request.

The midstream application authenticates (604) the first invocation request. The midstream application performs the authentication on the first token using the corresponding public key stored in a service registry. The midstream application performs the authentication on the initial token.

The midstream application verifies (606) that the midstream application is an instance of the permissible audience of the first token. The midstream application authorizes the first invocation request. The authorization can be based on a security policy that requires the presence of one more authenticated tokens.

Upon successful verification and authorization, the midstream application generates (608) a second token. The midstream application inserts the first token, or a reference to the first token, into a parent field of the second token. The second token can be a JWT. The second token can be a single use token.

The midstream application signs (610) the second token using a second private key of the midstream application. The midstream application has previously stored a corresponding second public key in the service registry.

The midstream application submits (612) to a downstream application, a second invocation request in association with the signed second token. The second token can be transmitted in a header of the second invocation request.

In some implementations, the first token includes a request field, e.g., the request claim of a JWT. The request field can be used to describe the intended operation to be invoked on the midstream application. Authorizing the first invocation request by the midstream application can include determining whether the first invocation request is sufficiently described by the request field.

The downstream application authenticates the second invocation request. The downstream application performs the authentication on the second token using the corresponding public key stored in the service registry. The downstream application performs the authentication on the first token using the corresponding public key stored in the service registry. The downstream application performs the authentication on the initial token.

The downstream application authorizes the second invocation request. The authorization is based on a security policy that requires the presence of one more authenticated tokens. The second token can include a request field. The request field describes the intended operation to be invoked by the midstream application on the downstream application. Authorizing the second invocation request by the downstream application can include determining whether the request field of the second token sufficiently describes the second invocation request.

The upstream application and the midstream application can populate the service registry upon startup of the upstream application and the midstream application. Populating the service registry includes generating respective public key/private key pairs, and inserting the public keys including the first public key and the second public key into the service registry.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
receiving, by a midstream application from an upstream application, a first invocation request, the first invocation request being associated with a first token signed by a first private key of the upstream application, the first token specifying permissible audience of the first token;
authenticating the first invocation request, including verifying the first token by the midstream application using a first public key corresponding to the upstream application and stored in a service registry;
verifying that the midstream application is an instance of the permissible audience of the first token;
upon successful verification, generating a second token by the midstream application, including inserting the first token into a parent field of the second token;
signing the second token by the midstream application using a second private key of the midstream application, wherein a corresponding second public key is stored in the service registry; and
submitting, by the midstream application to a downstream application, a second invocation request in association with the signed second token;
receiving, by the downstream application from the midstream application, the second invocation request;
determining, by the downstream application, that the second invocation request received from the midstream application is authenticated based on verifying that the midstream application is an instance of the permissible audience for the first token received from the upstream application; and
in response to determining that the second invocation request is authenticated based on verifying that the midstream application is an instance of the permissible audience for the first token received from the upstream application, authorizing, by the downstream application, the second invocation request,
wherein the upstream, midstream and downstream applications are configured to serve user requests in a chain of invocations within a microservice-based computing platform comprising a plurality of computers.

2. The method of claim 1, wherein each of the first token and the second token is a JSON Web token (JWT) and is transmitted in a header of a corresponding invocation request.

3. The method of claim 1, wherein each of the first token and the second token is a single use token.

4. The method of claim 1, comprising populating the service registry upon startup of the upstream application and the midstream application, the populating including authenticating with the service registry through an existing trust relationship and inserting the first public key and the second public key in the service registry.

5. The method of claim 1, wherein:
the first token includes an initial token including credentials of a user initiating the chain of invocations including the first invocation request and the second invocation request.

6. The method of claim 5, comprising authenticating the first invocation request by the midstream application, wherein:
authentication is performed on the first token, using the first public key stored in the service registry, and
authentication is performed on the initial token.

7. The method of claim 5, comprising authenticating the second invocation request by the downstream application, wherein:
authentication is performed on the second token using the second public key stored in the service registry,
authentication is performed on the first token contained within the second token, using the first public key stored in the service registry, and
authentication is performed on the initial token.

8. The method of claim 1, comprising authorizing the first invocation request by the midstream application, wherein authorization is based on a security policy that requires presence of one more authenticated tokens.

9. The method of claim 1, wherein:
the first token includes a request field, the request field describing intended operation to be invoked by the upstream application on the midstream application, and
authenticating the first invocation request by the midstream application comprises determining whether the request field of the first token sufficiently describes the first invocation request.

10. The method of claim 1, further comprising:
generating, by the upstream application, the first token, the first token specifying the permissible audience of the first token;
generating, by the upstream application, a first wrapper and associating the first token with the first wrapper; and
submitting, by the upstream application to the midstream application, the first invocation request in association with the first token and the first wrapper, wherein:
authenticating the first invocation request further comprises verifying, by the midstream application, a source of the first invocation request received from the upstream application using the first wrapper.

11. The method of claim 10, further comprising:
discarding, by the midstream application, the first wrapper from the first token;
generating, by the midstream application, a second wrapper and associating the second token with the second wrapper; and
verifying, by the downstream application, a source of the second invocation request received from the midstream application using the second wrapper, wherein:
the downstream application does not have access to the discarded first wrapper.

12. The method of claim 10, wherein:
generating, by the upstream application, the first wrapper comprises generating the first wrapper using a first private wrapper key, wherein a corresponding first public wrapper key is stored in the service registry; and
verifying, by the midstream application, a source of the first invocation request received from the upstream application using the first wrapper comprises verifying the first wrapper using the first public wrapper key stored in the service registry.

13. A non-transitory computer readable storage medium storing instructions executable by a data processing apparatus and upon such execution cause the data processing apparatus to perform operations comprising:

receiving, by a midstream application from an upstream application, a first invocation request, the first invocation request being associated with a first token signed by a first private key of the upstream application, the first token specifying permissible audience of the first token;

authenticating the first invocation request, including verifying the first token by the midstream application using a first public key corresponding to the upstream application and stored in a service registry;

verifying that the midstream application is an instance of the permissible audience of the first token;

upon successful verification, generating a second token by the midstream application, including inserting the first token into a parent field of the second token;

signing the second token by the midstream application using a second private key of the midstream application, wherein a corresponding second public key is stored in the service registry; and submitting, by the midstream application to a downstream application, a second invocation request in association with the signed second token;

receiving, by the downstream application from the midstream application, the second invocation request;

determining, by the downstream application, that the second invocation request received from the midstream application is authenticated based on verifying that the midstream application is an instance of the permissible audience for the first token received from the upstream application; and in response to determining that the second invocation request is authenticated based on verifying that the midstream application is an instance of the permissible audience for the first token received from the upstream application, authorizing, by the downstream application, the second invocation request, wherein the upstream, midstream and downstream applications are configured to serve user requests in a chain of invocations within a microservice-based computing platform comprising a plurality of computers.

14. The non-transitory computer readable storage medium of claim 13, wherein:

the first token includes an initial token including credentials of a user initiating the chain of invocations including the first invocation request and the second invocation request.

15. The non-transitory computer readable storage medium of claim 14, the operations comprising authenticating the first invocation request by the midstream application, wherein:

authentication is performed on the first token, using the first public key stored in the service registry, and
authentication is performed on the initial token.

16. The non-transitory computer readable storage medium of claim 14, the operations comprising authenticating the second invocation request by the downstream application, wherein:

authentication is performed on the second token using the second public key stored in the service registry,
authentication is performed on the first token contained within the second token, using the first public key stored in the service registry, and
authentication is performed on the initial token.

17. A system comprising:

one or more computers and one or more storage devices on which are stored instructions that are operable, when executed by the one or more computers, to cause the one or more computers to perform operations comprising:

receiving, by a midstream application from an upstream application, a first invocation request, the first invocation request being associated with a first token signed by a first private key of the upstream application, the first token specifying permissible audience of the first token;

authenticating the first invocation request, including verifying the first token by the midstream application using a first public key corresponding to the upstream application and stored in a service registry;

verifying that the midstream application is an instance of the permissible audience of the first token;

upon successful verification, generating a second token by the midstream application, including inserting the first token into a parent field of the second token;

signing the second token by the midstream application using a second private key of the midstream application, wherein a corresponding second public key is stored in the service registry; and submitting, by the midstream application to a downstream application, a second invocation request in association with the signed second token;

receiving, by the downstream application from the midstream application, the second invocation request;

determining, by the downstream application, that the second invocation request received from the midstream application is authenticated based on verifying that the midstream application is an instance of the permissible audience for the first token received from the upstream application; and in response to determining that the second invocation request is authenticated based on verifying that the midstream application is an instance of the permissible audience for the first token received from the upstream application, authorizing, by the downstream application, the second invocation request, wherein the upstream, midstream and downstream applications are configured to serve user requests in a chain of invocations within a microservice-based computing platform comprising a plurality of computers.

18. The system of claim 17, wherein:

the first token includes an initial token including credentials of a user initiating the chain of invocations including the first invocation request and the second invocation request.

19. The system of claim 18, the operations comprising authenticating the first invocation request by the midstream application, wherein:

authentication is performed on the first token, using the first public key stored in the service registry, and
authentication is performed on the initial token.

20. The system of claim 18, the operations comprising authenticating the second invocation request by the downstream application, wherein:

authentication is performed on the second token using the second public key stored in the service registry,
authentication is performed on the first token contained within the second token, using the first public key stored in the service registry, and
authentication is performed on the initial token.

* * * * *